United States Patent Office 2,963,460
Patented Dec. 6, 1960

2,963,460

ACRYLONITRILE POLYMERS PLASTICIZED WITH BIS(CYANOETHYL) PHOSPHINES

Robert Saxon, Stamford, Conn., assignor to American Cyanamid Company, New York, N.Y., a corporation of Maine No Drawing. Filed Aug. 7, 1958, Ser. No. 753,652

6 Claims. (Cl. 260—30.6)

The present invention relates to improved copolymeric compositions containing an average of at least 60% by weight of combined acrylonitrile. More specifically, the present invention relates to the plasticization of polymers containing at least 60% acrylonitrile with certain bis-(cyanoethyl) phosphines in order to improve the moldability and flexural properties of these polymers for the production of useful articles of manufacture.

Polyacrylonitrile is known to have various properties which make it a very desirable material in the field of plastics. It is highly resistant to common organic solvents; it is chemically inert; it has a high softening point, and it can be prepared easily by conventional free radical polymerization techniques. Some of the qualities, however, heretofore have been considered drawbacks to broader usage of this polymer. The high softening point, while favoring dimensional stability of a finished article manufactured, makes unmodified polyacrylonitrile almost impossible to mold by the usual compression or injection methods. Exceptionally high temperatures are required, leading to discoloration. The chemical inertness which imparts solvent resistance is due to strong inter-chain hydrogen bonding. At the same time, however, this property is believed to lead to extreme rigidity, brittleness and low impact and flexural strength in the polymer. Accordingly, polymers containing predominant amounts of combined acrylonitrile have been generally unsuitable for various applications, particularly in the manufacture of molded articles and as a film-forming composition due to the poor flowing properties of this polymer and because of the brittle character of finished product. Plasticizers heretofore incorporated with polymers containing a predominance of combined acrylonitrile in order to improve the flexural properties of these polymers have not been satisfactory, largely because of the significant incompatibility of the plasticizing compound resulting in a gradual migration of the plasticizer to the surface with consequent brittleness and often discoloration, or because the plasticizer is water soluble and is consequently leached from the polymeric article upon contact with water, also resulting in brittleness. The present invention avoids such shortcomings and provides an improved plasticized polyacrylonitrile composition having excellent flexural properties and in which the plasticizer is water insoluble and fully compatible with the polymer.

It is an object of the present invention to provide a polymeric composition containing a preponderance of combined acrylonitrile which has improved moldability and product flexibility by incorporating into the polymer certain bis(cyanoethyl) phosphines as plasticizers. Other objects and advantages will become apparent hereinafter as the description of the invention proceeds.

The principal requirements for a plasticizer are: compatibility, i.e. freedom from separation or exudation when blended with the polymer; solvency, i.e. ability of the plasticizer to soften the polymer; permanence, i.e. the plasticizer must be non-volatile, chemically stable and resistant to leaching by water or other solvents under service conditions, and the plasticizer should be non-toxic.

The present invention is based upon the discovery that homopolymers and copolymers of acrylonitrile, specifically copolymers containing in their molecules an average of at least 60% by weight of combined acrylonitrile are compatible with certain water-insoluble bis(cyanoethyl) phosphines. Compounds of this type which have been found useful are those produced by reaction of bis(cyanoethyl) phosphine [(N≡C—CH$_2$CH$_2$)$_2$PH] with certain unsaturated compounds containing not over 8 carbon atoms. These compounds may be represented by the formula

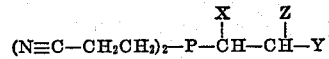

wherein X is a substituent selected from the group consisting of hydrogen, carbomethoxy [—CO—O—CH$_3$], and carboethoxy [—CO—O—CH$_2$CH$_3$] radicals, Y is a substituent selected from the group consisting of hydrogen, alkyl and carboxyalkyl radicals, and Z is a substituent selected from the group consisting of hydrogen, chlorine, bromine, and methyl radicals, and the total of carbon atoms in X, Y and Z does not exceed 6. When the total number of carbon atoms in X, Y and Z is in excess of 6, the plasticizer has a tendency to be incompatible with the polymer, resulting in an undesirably opaque appearance or a sweating out of the plasticizer from the polymer. These effects of using plasticizers containing carbon chains in excess of 6 generally render the composition useless for almost all applications wherein resins are employed.

These bis(cyanoethyl) phosphine compounds as employed in my invention are contemplated as permanent plasticizers which are permitted to remain in the shaped homopolymer or copolymer to provide continuing flexibility in the article of manufacture, whether it be a film or molded article.

The bis(cyanoethyl) phosphines employed in the present invention are believed to be new chemical compounds, a suitable procedure for their preparation being described below. However, these compounds as such and their means of preparation, apart from their use herein described and claimed, form no part of the present invention.

EXAMPLE A

*Preparation of propyl-bis(cyanoethyl) phosphine*

A vessel capable of withstanding high pressures is charged with 28 parts of bis(2-cyanoethyl) phosphine, 8.2 parts of propylene, and 1.46 parts of di-tertiary butyl peroxide. The vessel is sealed, heated at 135–142° for 4 hours under its own pressure, cooled, and vented. The liquid contents of the vessel are then distilled under vacuum. A fraction is collected boiling at 158–160° at 0.25 mm. pressure, amounting to 24 parts (67% yield). The fraction solidifies on standing at room temperature. Analysis gave 59.34% carbon, 8.49% hydrogen, and 16.74% phosphorous, in close agreement with the theoretical values for propyl bis(cyanoethyl) phosphine, namely 59.32% carbon, 8.30% hydrogen, and 17.00% of phosphorous.

EXAMPLE B

*Preparation of 2-(carbobutoxy)ethyl bis(cyanoethyl) phosphine*

A mixture of 28 parts of bis(2-cyanoethyl) phosphine, 200 parts of acetonitrile, and 1 part of pentamethylguanidine is placed in a system previously flushed with nitrogen. A solution of 28 parts of butyl acrylate in 50 parts of acetonitrile is added, with stirring, during a 30-minute period, and the resulting mixture is refluxed for 2 hours. The reaction product is then extracted three times with 100 parts each time of saturated aqueous sodium chloride and dried over calcium sulfate. Upon removal of acetonitrile by heating under vacuum, 46 parts (82%) of a yellow viscous liquid remains. A small portion of this product is distilled at 1.5 mm. pressure and at a stillpot temperature of 230°. Analysis of the product gave 58.19% carbon, 7.89% hydrogen, 10.44% nitrogen and 11.55% phosphorous, closely agreeing with the theoretical values of 58.50% carbon, 8.01% hydrogen, 10.32% nitrogen and 11.31% phosphorous.

The preparation of other cyanoethyl phosphines may be accomplished via the reaction of the corresponding unsaturated compounds with bis(2-cyanoethyl) phosphine. For readily volatile unsaturated compounds, the sealed vessel method is suitable, while for others the reflux procedure is more convenient. Examples of suitable phosphines within the contemplation of the invention in addition to those whose preparation is described above include:

| Product | Unsaturated Parent |
| --- | --- |
| ethyl bis(cyanoethyl) phospine | ethylene. |
| 2-methylpropyl bis(cyanoethyl) phosphine | isobutylene. |
| butyl bis(cyanoethyl) phosphine | 1-butene. |
| 3-hydroxypropyl bis(cyanoethyl) phosphine | allyl alcohol. |
| 2-(carbomethoxy)ethyl bis(cyanoethyl) phosphine. | methyl acrylate. |
| 2-(carboethoxy)ethyl bis(cyanoethyl) phosphine. | ethyl acrylate. |
| 2-methyl-2-(carbomethoxy)ethyl bis (cyanoethyl) phosphine. | methyl methacrylate. |
| 1,2-bis(carboethoxy)ethyl bis (cyanoethyl) phosphine. | ethyl maleate. |
| 1,2-bis(carbomethoxy)ethyl bis (cyanoethyl) phosphine. | methyl maleate. |
| 2-chloro-2-(carboethoxy)ethyl bis(cyanoethyl) phosphine. | ethyl 2-chloroacrylate. |

Homopolymeric acrylonitrile and acrylonitrile copolymers containing in the polymer molecules an average of at least 60% by weight of combined acrylonitrile are employed in carrying the present invention into effect. In a preferred embodiment, the invention contemplates copolymers of acrylonitrile containing from 60% to about 90% acrylonitrile and from 40% to about 10% of a different copolymerizable monomer having a $CH_2=C<$ group. These polymers and copolymers are prepared by methods now well known to those skilled in the art. In some cases, the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 60% by weight of combined acrylonitrile. The expression "polymerization product containing in the polymer molecules an average of at least 60% by weight of combined acrylonitrile," as used herein, means a polymerization product (polymer, copolymer or interpolymer or mixtures thereof) containing in its molecules an average of at least 60% by weight of the acrylonitrile unit $$-CH_2-CH-CN$$
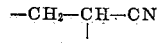

or, otherwise stated, at least 60% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 60% by weight of combined acrylonitrile are compounds containing a single $CH_2=C<$ grouping, for instance, the vinyl esters and especially the vinyl esters of saturated aliphatic monocarboxylic acids, e.g. vinyl acetate, vinyl propionate, vinyl butyrate, etc.; vinyl and vinylidene halides, e.g. the vinyl and vinylidene chlorides, bromides and fluorides; allyl, methallyl and other unsaturated monohydric alcohol esters of monobasic acids, e.g. allyl and methallyl acetates, laurates, cyanides, etc.; acrylic and alkacrylic acids, e.g. methacrylic, ethacrylic, etc., and esters and amides of such acids, e.g. methyl, ethyl, propyl, butyl, etc., acrylates and methacrylates, acrylamide, methacrylamide, N-methyl, -ethyl, -propyl, -butyl, etc. acrylamides and methacrylamides, etc.; methacrylonitrile, ethacrylonitrile and other hydrocarbon-substituted acrylonitriles; vinyl aromatic monomers, e.g. styrene, the methyl styrenes, e.g. ortho-, meta- and para-methyl styrene, dimethyl styrene, as well as halogenated styrenes, such as chloro- and bromo-styrenes, methyl styrenes and the like; unsaturated aliphatic hydrocarbons containing a single $CH_2=C<$ grouping, e.g. isobutylene, etc.; and numerous other vinyl, acrylic and other compounds containing a single $$CH_2=C<$$

grouping which are copolymerizable with acrylonitrile to yield thermoplastic copolymers.

The proportions of monomers in the polymerizable mixture may be varied as desired or as may be required in order to obtain a polymerization product containing in the polymer molecules an average of at least 60% by weight of combined acrylonitrile. Thus, when the polymerization rate of the monomers present in the polymerizable mixture is substantially the same, the proportions may be, for example, from, by weight, about 60% to about 100% of acrylonitrile to from about 40% to none of the other comonomer. When the polymerizable mixture contains, in addition to the acrylonitrile a monomer such, for example, as vinyl chloride, vinyl acetate, isobutylene, etc., which polymerizes at a rate different from that of acrylonitrile, then it may be necessary to subject to polymerization conditions a mixture in which the acrylonitrile constitutes as little as, for instance, 50% by weight thereof in order to obtain a polymerization product containing in the copolymer molecules an average of at least 60% by weight of acrylonitrile. For example, in the copolymerization of acrylonitrile and isobutylene, a monomer charge in the ratio of acrylonitrile to isobutylene of about 50:50 is generally required to obtain a copolymer having a combined ratio of 70:30, respectively.

Any suitable method of polymerizing the monomeric acrylonitrile or mixture of monomers may be employed. One suitable method comprises polymerizing the monomer or mixture of monomers in an aqueous emulsion using a suitable polymerization catalyst such as ammonium persulfate, for example. Other polymerization methods, however, also may be used, such as those described in Bauer et al. U.S. Patents No. 2,160,054 and 2,436,926, for example. The polymeric and copolymeric acrylonitriles used in practicing my invention may be of any suitable molecular weight, but ordinarily the molecular weight (average molecular weight) is within the range of 40,000 to 1,000,000 or higher, and advantageously is of the order of 50,000 to 750,000 as calculated from a viscosity measurement of the polymer in dimethyl formamide using the well known Staudinger equation, the application of which is set forth in U.S. Patent No. 2,404,713.

Incorporation of the plasticizers in the acrylonitrile polymer may be conducted by any suitable procedure, either by dissolution or such as by blending on a two-roll mill or by use of a Banbury mixer, for example. The blending time may be shortened by using a comminuted polymer. To minimize the possibility of discoloration, it is generally advisable to employ blending temperatures as low as is consistent with practical considerations, although temperatures up to about 170° C. and even higher may be employed with certain polymers and mixing cycles. The proportions of the acrylonitrile polymerization product and the cyanoethyl phosphine plasticizer in the composition of my invention may be varied widely, depending mainly on the properties desired in the particular use for which the composition is intended. In the preparation of a film, for example, from which substantially all of the compound as a solvent, such as dimethyl formamide, is employed, amounts of as little as 5%, based on the weight of the combined acrylonitrile in the polymer, may be sufficient. On the other hand, amounts of 100% and even greater quantities of the plasticizer based on the weight of combined acrylonitrile may be usefully employed.

The plasticized compositions of the invention may not only be molded into useful articles of manufacture by procedures well known to those with ordinary skill in the art, but as noted hereinabove the plasticized acrylonitrile polymerization product may be cast in the form of films. For example, a dimethyl formamide solution of the acrylonitrile polymer may be cast upon a revolving drum which is partly immersed in a coagulating bath of, for example, water, cold benzene, etc., which will extract the dimethyl formamide and serve to deposit the acrylonitrile polymerization product as a thin film on the drum as it passes through the bath. The resulting film may be stretched, if desired, lengthwise and crosswise by suitable apparatus to improve its properties. Alternatively, solutions of the acrylonitrile polymer with the bis (cyanoethyl) phosphine may be evaporated in a gaseous atmosphere to form films which may be similarly stretched to improve their properties.

Compositions comprising the cyanoethyl phosphine compounds hereinbefore described with polymer comprising at least 60% combined acrylonitrile may also be employed as a dielectric or in the manufacture of components for electrical applications. The plasticized composition can also be combined with paper, fabrics and other dielectrics.

In order that those skilled in the art may better understand how the invention may be practiced, the following examples are given by way of illustration and are not to be construed as a limitation of the invention. In the examples, all parts are parts by weight unless noted otherwise.

EXAMPLE 1

Two parts of a copolymer comprising 78% acrylonitrile and 22% styrene, together with one part of propyl bis(cyanoethyl) phosphine as plasticizer are dissolved in 20 parts of dimethyl formamide. From the solution so prepared a film is cast and allowed to dry overnight. A soft, smooth, pliable film, which does not break on repeated flexing, is obtained. A control film prepared in a like manner but containing no propyl bis(cyanoethyl) phosphine is stiff and brittle and breaks when flexed.

EXAMPLE 2

The proportions and procedure as stated in Example 1 are followed, with the exception that one part of 2 (carbobutoxy)ethyl bis(cyanoethyl) phosphine is employed instead of propyl bis(cyanoethyl) phosphine. The dried film is soft, smooth and pliable and withstands rigorous flexing.

EXAMPLE 3

Equal parts of an acrylonitrile-isobutylene copolymer (analyzing 76% acrylonitrile and 24% isobutylene) and of the reaction product of bis(cyanoethyl) phosphine and diethyl maleate prepared in a manner similar to that given for Example B were ground together in a mortar and heated in a covered dish for 20 minutes at 150°. A tough, gel-like mass resulted. When the copolymer wa similarly heated alone, it remained as a crumbly powder.

From the foregoing description, it will be seen that the present invention provides compositions comprising an acrylonitrile polymerization product and a plasticizer. These compositions can be shaped or fabricated, as by extrusion, molding, casting, etc., into a wide variety of useful articles. Lubricants, antistatic agents and other conventional modifiers of acrylonitrile polymerization products can be incorporated therein at any suitable stage of the operation.

While the invention has been described with reference to various specific compounds and examples, it will be understood that the invention is not limited to these illustrative examples, but is to be limited only by the scope of the claims which follow.

I claim:

1. A synthetic resinous composition comprising (1) a polymerization product selected from the group consisting of homopolymers of acrylonitrile and copolymers containing at least 60 weight percent of combined acrylonitrile, the remainder being a compound copolymerizable with acrylonitrile and containing a $CH_2=C<$ group, and (2) a plasticizer represented by the formula

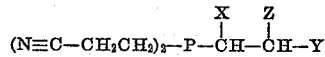

wherein X is a substituent selected from the group consisting of hydrogen, carbomethoxy and carboethoxy radicals; Y is a substituent selected from the group consisting of hydrogen, alkyl and carboxyalkyl radicals; and Z is a substituent selected from the group consisting of hydrogen, chlorine, bromine, and methyl radicals, and the total number of carbon atoms in X, Y and Z does not exceed 6.

2. A synthetic resinous composition comprising (1) a copolymer containing from 60 to about 90 weight percent combined acrylonitrile and from 60 to about 10 weight percent of a different compound copolymerizable with acrylonitrile and containing a $CH_2=C<$ group and (2) propyl bis(cyanoethyl) phosphine.

3. A synthetic resinous composition comprising (1) a copolymer containing from 60 to about 90 weight percent combined acrylonitrile and from 60 to about 10 weight percent of a different compound copolymerizable with acrylonitrile and containing a $CH_2=C<$ group and (2) 2-(carbobutoxy)ethyl bis(cyanoethyl) phosphine.

4. A synthetic resinous composition comprising (1) a copolymer containing from 60 to about 90 weight percent combined acrylonitrile and from 60 to about 10 weight percent of a compound copolymerizable with acrylonitrile and containing a $CH_2=C<$ group and (2) the reaction product of bis(cyanoethyl) phosphine and diethyl maleate.

5. A synthetic resinous composition comprising (1) a polymerization product containing from 60 to about 90 weight percent combined acrylonitrile and from 40 to about 10 weight percent isobutylene and (2) a plasticizer represented by the formula

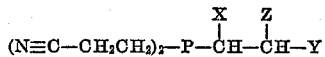

wherein X is a substituent selected from the group consisting of hydrogen, carbomethoxy and carboethoxy radicals; Y is a substituent selected from the group consisting of hydrogen, alkyl and carboxyalkyl radicals; and Z is a substituent selected from the group consisting of hydrogen, chlorine, bromine, and methyl radicals, and the total number of carbon atoms in X, Y and Z does not exceed 6.

6. A synthetic resinous composition comprising (1) a polymerization product containing from 60 to about 90 weight percent combined acrylonitrile and from 40 to about 10 weight percent styrene and (2) a plasticizer represented by the formula

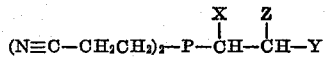

wherein X is a substituent selected from the group consisting of hydrogen, carbomethoxy and carboethoxy radicals; Y is a substituent selected from the group consisting of hydrogen, alkyl and carboxyalkyl radicals; and Z is a substituent selected from the group consisting of hydrogen, chlorine, bromine, and methyl radicals, and the total number of carbon atoms in X, Y and Z does not exceed 6.

References Cited in the file of this patent

UNITED STATES PATENTS 2,642,406    Dickey et al. _____ June 16, 1953

UNITED STATES PATENT OFFICE
CERTIFICATION OF CORRECTION

Patent No. 2,963,460 December 6, 1960

Robert Saxon

It is hereby certified that error appears in the above numbered patent requiring correction and that the said Letters Patent should read as corrected below.

Column 3, line 16, in the table, second column thereof, for the heading "Unsaturated Parent" read -- Unsaturated Parent Compound --.

Signed and sealed this 23rd day of May 1961.

(SEAL)
Attest:

ERNEST W. SWIDER
Attesting Officer

DAVID L. LADD
Commissioner of Patents